(12) United States Patent
Clark et al.

(10) Patent No.: US 9,927,459 B2
(45) Date of Patent: Mar. 27, 2018

(54) ACCELEROMETER WITH OFFSET COMPENSATION

(71) Applicant: Analog Devices, Inc., Norwood, MA (US)

(72) Inventors: William A. Clark, Winchester, MA (US); Xin Zhang, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 428 days.

(21) Appl. No.: 14/073,160

(22) Filed: Nov. 6, 2013

(65) Prior Publication Data

US 2015/0122024 A1     May 7, 2015

(51) Int. Cl.
| | |
|---|---|
| *G01P 15/125* | (2006.01) |
| *G01P 21/00* | (2006.01) |
| *G01P 15/08* | (2006.01) |

(52) U.S. Cl.
CPC ............ *G01P 15/125* (2013.01); *G01P 21/00* (2013.01); *G01P 2015/0814* (2013.01); *G01P 2015/0868* (2013.01)

(58) Field of Classification Search
CPC ............................... G01P 15/125; G01P 21/00
USPC ....................................................... 73/514.32
See application file for complete search history.

(56) References Cited

U.S. PATENT DOCUMENTS

| | | | |
|---|---|---|---|
| 5,719,336 A | 2/1998 | Ando et al. | |
| 5,939,633 A | 8/1999 | Judy | ............ 73/514.32 |
| 6,841,992 B2 | 1/2005 | Yue et al. | |
| 6,892,576 B2 | 5/2005 | Samuels et al. | |
| 7,520,171 B2 | 4/2009 | Merassi et al. | |
| 7,610,809 B2 | 11/2009 | McNeil et al. | |
| 8,056,415 B2 | 11/2011 | McNeil et al. | ............ 73/514.32 |
| 8,146,425 B2 | 4/2012 | Zhang et al. | |
| 8,215,177 B2 | 7/2012 | Hayner et al. | ................. 73/765 |
| 8,321,170 B2 | 11/2012 | Schultz et al. | ................ 702/104 |
| 8,453,504 B1 * | 6/2013 | Mao | ....................... G01C 19/56 73/504.14 |

(Continued)

FOREIGN PATENT DOCUMENTS

| | | | |
|---|---|---|---|
| CN | 103852598 A | 6/2014 | |
| DE | 102013111787 A1 | 6/2014 | |
| EP | 1 640 726 | 3/2006 | ............ G01P 15/125 |

OTHER PUBLICATIONS

International Searching Authority, International Search Report—International Application No. PCT/US2014/057582, dated Dec. 10, 2014, together with the Written Opinion of the International Searching Authority, 11 pages.

(Continued)

*Primary Examiner* — Lisa Caputo
*Assistant Examiner* — Tarun Sinha
(74) *Attorney, Agent, or Firm* — Wolf, Greenfield & Sacks, P.C.

(57) ABSTRACT

An accelerometer has a movable mass suspended above a substrate, and a variable acceleration capacitor supported by the substrate. The movable mass has a mass anchor securing the mass to the substrate, while the acceleration capacitor has both a stationary finger extending from the substrate, and a movable finger extending from the movable mass. The accelerometer also has a variable stress capacitor, which also includes the stress finger, for determining movement of the mass anchor relative to the substrate.

20 Claims, 4 Drawing Sheets

(56) References Cited

U.S. PATENT DOCUMENTS

| | | |
|---|---|---|
| 8,689,632 B2 | 4/2014 | Jia et al. |
| 8,839,670 B2 | 9/2014 | Qiu et al. |
| 8,960,002 B2 | 2/2015 | Nasiri et al. |
| 9,176,157 B2 | 11/2015 | Simoni et al. |
| 2004/0231420 A1* | 11/2004 | Xie ................ B81B 3/0062 73/514.32 |
| 2008/0178671 A1* | 7/2008 | Miller ................ G01P 15/131 73/488 |
| 2009/0314085 A1 | 12/2009 | Stahl et al. |
| 2010/0107763 A1 | 5/2010 | Lin et al. |
| 2011/0023604 A1 | 2/2011 | Cazzaniga et al. |
| 2011/0030473 A1* | 2/2011 | Acar ................ G01C 19/5712 73/504.12 |
| 2012/0125104 A1* | 5/2012 | Qiu ................ G01P 15/125 73/514.32 |
| 2013/0068018 A1* | 3/2013 | Seeger ............ G01C 19/5712 73/504.12 |
| 2013/0104651 A1 | 5/2013 | Li et al. |
| 2013/0180332 A1 | 7/2013 | Jia et al. |
| 2013/0186171 A1 | 7/2013 | Merrill, Jr. et al. |
| 2013/0214367 A1 | 8/2013 | van der Heide |
| 2013/0333471 A1 | 12/2013 | Chien |
| 2014/0298909 A1 | 10/2014 | Simoni et al. |
| 2015/0268268 A1 | 9/2015 | Liu et al. |
| 2016/0097791 A1 | 4/2016 | Zhang |

OTHER PUBLICATIONS

International Search Report and Written Opinion dated Jan. 26, 2016 in connection with International Application No. PCT/US2015/052597.

International Search Report and Written Opinion dated Dec. 10, 2014 for Application No. PCT/US2014/057582.

U.S. Appl. No. 14/505,928, filed Oct. 3, 2014, Zhang.

PCT/US2014/057582, dated Dec. 10, 2014, International Search Report and Written Opinion.

PCT/US2015/052597, dated Jan. 26, 2016, International Search Report and Written Opinion.

\* cited by examiner

FIG. 4

ACCELEROMETER WITH OFFSET COMPENSATION

FIELD OF THE INVENTION

The invention generally relates to accelerometers and, more particularly, the invention relates to mitigating stress induced errors in accelerometers.

BACKGROUND OF THE INVENTION

Microelectromechanical systems ("MEMS") are used in a growing number of applications. For example, MEMS currently are implemented as gyroscopes to detect pitch angles of airplanes, and as accelerometers to selectively deploy air bags in automobiles. In simplified terms, such MEMS devices typically have a structure suspended above a substrate, and associated on-chip or off-chip electronics that both senses movement of the suspended structure and delivers the sensed movement data to one or more external devices (e.g., an external computer). The external device processes the sensed data to calculate the property being measured (e.g., pitch angle or acceleration).

The associated electronics, substrate, and movable structure typically are formed on one or more dies (referred to herein simply as a "die") that often are secured within a package. For example, the package, which typically hermetically seals the die when implemented as an accelerometer, may be produced from ceramic or plastic. The package includes interconnects that permit the electronics to transmit the movement data to the external devices. To secure the die to the package interior, the bottom surface of the die commonly is bonded (e.g., with an adhesive or solder) to an internal surface (e.g., a die attach pad) of the package. Accordingly, substantially all of the area of the bottom die surface is bonded to the internal surface the package.

Problems can arise, however, when the temperatures of the two surfaces change. In particular, because both surfaces can have different coefficients of thermal expansion, the package can apply a mechanical stress to the substrate of the die. This stress (referred to in the art as "linear stress," which, in this case, is thermally induced) undesirably can bend or flex the substrate to an unknown curvature. Substrate bending or flexing consequently can affect movement of the die structures, thus causing the output data representing the property being measured (e.g., acceleration) to be erroneous. In a similar manner, mechanically induced linear or torsional stress applied to the package also can be translated to the die, thus causing the same undesirable effects.

SUMMARY OF VARIOUS EMBODIMENTS

In accordance with one embodiment of the invention, an accelerometer has a movable mass suspended above a substrate, and a variable acceleration capacitor supported by the substrate. The accelerometer also has a mass anchor securing the mass to the substrate, while the acceleration capacitor has both a stationary finger extending from the substrate, and a movable finger extending from the movable mass. The accelerometer also has a variable stress capacitor, which also includes the stress finger, for determining movement of the mass anchor relative to the acceleration capacitor stationary finger or substrate.

In some embodiments, such as those similar to that noted above, the acceleration capacitor has at least two fingers—one affixed to the movable mass and the other to the substrate via an anchor. The variable stress capacitor also has two fingers that each are affixed to the substrate in a manner similar to the other elements—one is affixed to the substrate in a manner similar to the mass anchor and the second element is affixed to the substrate in a manner similar to the acceleration capacitor. Moreover, the stress finger may measure any number of different relative displacements (e.g., translation or displacement) of the mass anchor and acceleration capacitor anchor resulting from substrate distortion.

The stress capacitor may have the stationary finger and a movable stress finger suspended above the substrate. The acceleration capacitor also may include a plurality of acceleration capacitors that each includes movable and stationary fingers, while the variable stress capacitor also may include a plurality of variable stress fingers that each includes at least one of the stationary fingers. Some implementations may include a frame that is suspended above the substrate and secured to the anchor. A plurality of stress fingers may extend from the frame to assist in detecting the noted relative anchor/finger movement.

The accelerometer also may include an output node configured to deliver an output signal representing acceleration. For example, the output node may be electrically connected with both the acceleration capacitor and the stress capacitor. The capacitance of the stress capacitor may be combined with the capacitance of the acceleration capacitor to produce a noise/stress mitigated output acceleration signal. Moreover, the movable mass may include a main portion, while the accelerometer also may have a spring coupled between the anchor and the main portion of the movable mass.

Depending on the application, the acceleration capacitor can detect acceleration in one or more of a number of different directions. For example, the acceleration capacitor may detect acceleration a) in a direction generally parallel with the substrate, b) in a direction generally perpendicular to the substrate, or c) in directions both generally parallel and generally perpendicular to the substrate. Other embodiments may detect angular accelerations.

In accordance with another embodiment, an accelerometer has a movable mass suspended above a substrate, and a variable acceleration capacitor coupled with the substrate and configured to detect acceleration of the movable mass relative to the substrate. The movable mass has a mass anchor securing the mass to the substrate. The accelerometer also has a variable stress capacitor for determining movement of the mass anchor relative to the acceleration capacitor stationary finger or substrate. The stress capacitor illustratively is integrated with the acceleration capacitor.

In accordance with other embodiments, a method provides an accelerometer having a movable mass suspended above a substrate, and an anchor connecting the mass to the substrate. The accelerometer also has an output for delivering a signal representing movement of the mass relative to the substrate in response to an acceleration. Next, the method measures anchor movement relative to the substrate, and provides an offset signal or acceleration signal to the output as a function of the measured anchor movement relative to the substrate.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an accelerometer chip produces an output acceleration signal that is at least partially immune to die stress. To that end, the accelerometer chip has an integrated stress capacitor that cooperates with its local primary acceleration capacitor to produce a noise-mitigated output signal representing acceleration. Accordingly, the accelerometer should have a much more controllable offset voltage or current, which, as discussed below, ideally is a stable, low value (e.g., zero volts) at the output node/pad of the accelerometer.

Specifically, like other accelerometers, this accelerometer has an acceleration capacitor that produces a signal representing both the detected acceleration and die stress. Unlike other accelerometers, however, this accelerometer also has the noted stress capacitor, which generates a signal representing stress in the chip itself (i.e., in some embodiments, the deflection of the mass anchor with regard to the one of the acceleration capacitor plates, discussed below). Accordingly, to mitigate the error generated by the stress, the signal path of the accelerometer chip combines the acceleration capacitor signal with the stress capacitor signal, removing much of the stress related component from the acceleration capacitor signal. As a result, the output node of the accelerometer produces an output acceleration signal with a minimum amount of signal noise caused by die stress. Details of various embodiments are discussed below.

Figure 1:
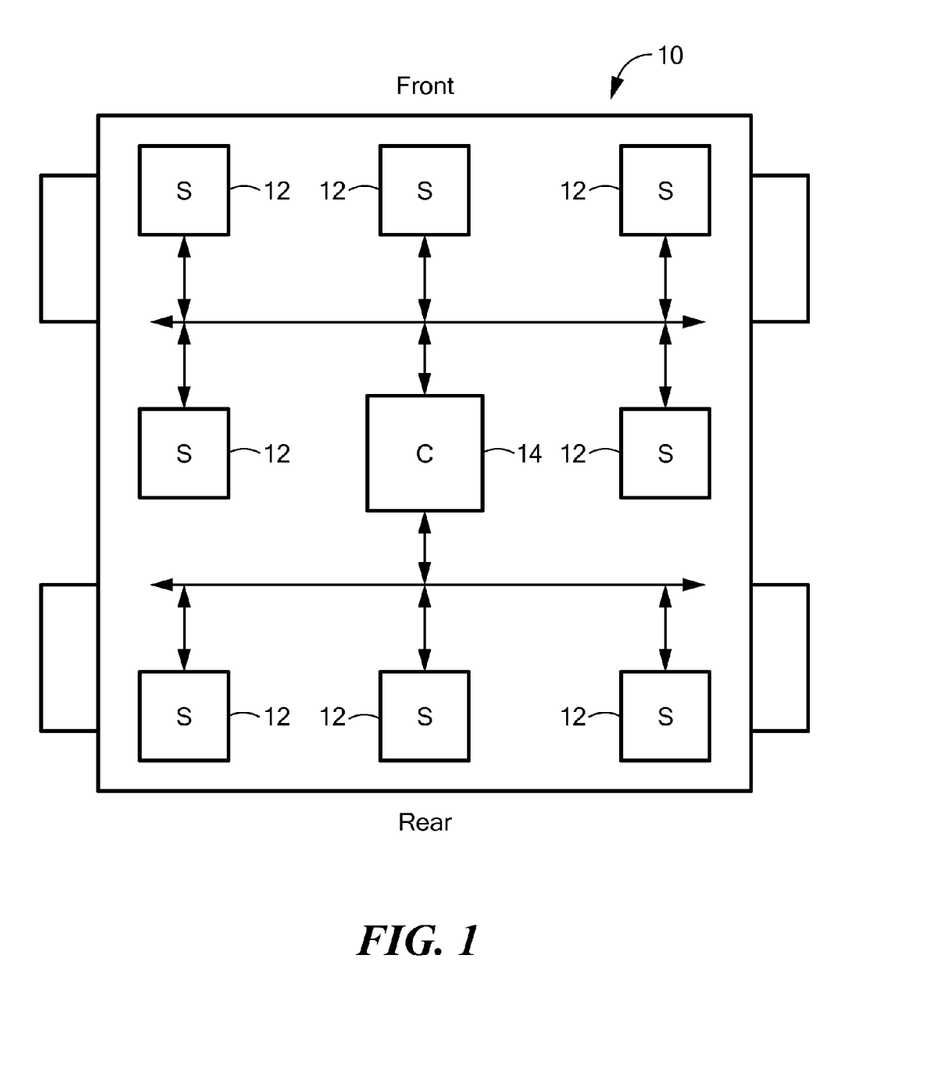
FIG. 1 schematically shows one application of an accelerometer that may be configured in accordance with illustrative embodiments of the invention.

As noted above, accelerometers are used in a wide variety of applications. Among others, accelerometers often are used for navigation systems, gaming devices, and safety systems. FIG. 1 schematically shows one such application, in which a plurality of sensors 12 (e.g., accelerometers) sense movement of an automobile 10. To that end, like many automobiles, the exemplary automobile 10 of FIG. 1 includes a body and four wheels. As is conventional in the art, the body has a plurality of packaged accelerometers 12A (FIG. 2A, discussed below) in specifically located areas for detecting a rapid deceleration. For example, the body may have packaged accelerometers 12A along its periphery, as well as within its interior. Those skilled in the art often refer to these packaged accelerometers 12A as "satellite sensors." Each of these packaged accelerometers 12A communicates with a central computer 14 through some conventional communication medium, such as a wiring harness and/or bus.

The packaged accelerometers 12A may be part of a wide variety of different vehicle systems. For example, some of the packaged accelerometers 12A may be part of the automobile safety system for deploying front and/or side airbags in the event of an accident. Other packaged accelerometers 12A may be part of an underlying navigation system. Typically, the packaged accelerometers 12A detect linear acceleration in the Cartesian coordinate system (i.e., in the X-direction, Y-direction, and/or Z-direction). Alternatively, or in addition, one or more of the packaged accelerometers 12A may detect rotational movement. Of course, the automobile 10 may have other sensors, such as gyroscopes, for detecting rotational movement.

Figure 2A:
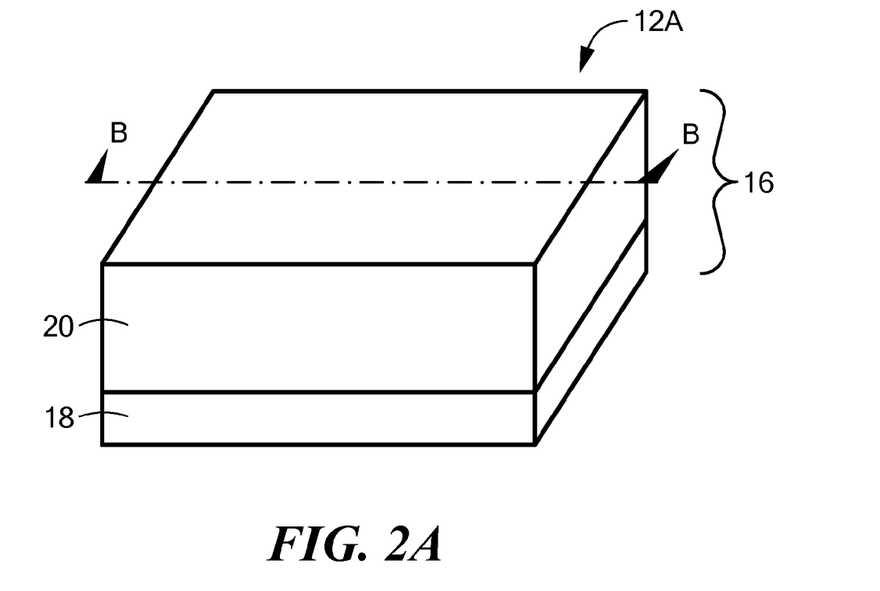
FIG. 2A schematically shows a perspective view of a packaged accelerometer that may be configured in accordance with illustrative embodiments of the invention.
Figure 2B:
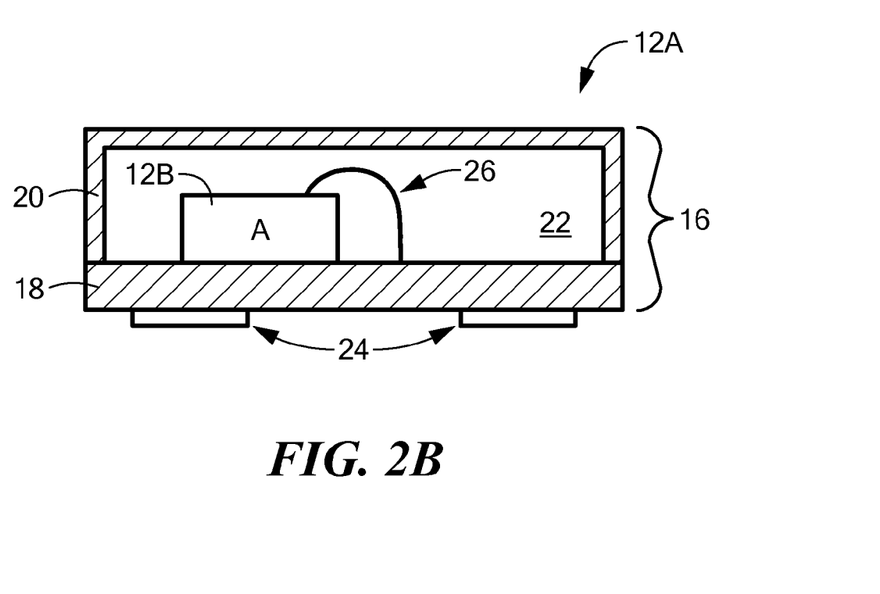
FIG. 2B schematically shows a cross-sectional view of the packaged accelerometer of FIG. 2A along line B-B.

Each of the packaged accelerometers 12A includes a fragile accelerometer chip/die 12B, which is packaged to protect its fragile microstructure. To that end, those skilled in the art can package the accelerometer chips 12B in any of a variety of conventional manners. For example, the accelerometer chips 12B may be part of a chip level package, which often includes the accelerometer chip 12B itself. As another example, FIG. 2A schematically shows a packaged accelerometer 12A using a type of package that completely encapsulates the accelerometer chip 12B. FIG. 2B schematically shows a cross-sectional view of the same packaged accelerometer 12A.

Specifically, the packaged accelerometer 12A includes a package 16 forming an interior chamber 22 that completely encapsulates or contains its accelerometer chip 12B and accompanying electronics. Among other ways, the electronics may be integrated onto the accelerometer chip 12B (as shown in FIG. 2B), or off-chip on a separate circuit die, such as an application specific integrated circuit (i.e., an "ASIC," not shown). One primary function of the electronics is to control and manage input to and output from the accelerometer chip 12B. For example, among other things, a circuit chip may amplify varying capacitance signals produced by the accelerometer chip 12B, and control the voltage applied to the accelerometer chip 12B.

In illustrative embodiments, the package 16 has a base 18 that, together with a corresponding lid/cover 20, forms the interior chamber 22 containing the accelerometer chip 12B and, if present, an ASIC. The bottom face of the package base 18 has a number of external contacts/bond pads 24 for electrically (and physically, in many anticipated uses) connecting the packaged accelerometer 12A with an external apparatus (not shown), such as a printed circuit board or other electrical interconnect apparatus. A wire bond 26 extending from one or more pads on the accelerometer chip 12B exterior to the base 18 electrically connects the accelerometer chip 12B to external pads 24 and, ultimately, the exterior environment. For example, one of the pads on the accelerometer chip 12B may act as an output node to the accelerometer (producing acceleration signals), while another accelerometer chip pad may receive an input voltage. Accordingly, during use, the accelerometer chip 12B converts detected acceleration into electrical signals, and routes those signals through its own output pad, through the wire bond 26, to external contacts/bond pads 24 in the base 18, and finally to the underlying circuit board.

In illustrative embodiments, the package base 18 is formed from an electrical interconnect apparatus, such as a ceramic package material, carrier, printed circuit board material (e.g., using alternating layers of FR-4 or a BT-resin/epoxy laminate-type material). Other types of packages may be used, however, such as premolded, leadframe-type packages (also referred to as a "premolded package"). Although shown as being flat, the base 18 also may form a cavity package.

The lid 20 in the embodiments shown is a cavity-type, solid metal lid, which has four walls extending generally orthogonally from a top, interior face to form a cavity. For example, in illustrative embodiments, the lid 20 is a plastic covering having a generally cup-shaped concavity defining a part of the package chamber 22. The lid 20 secures to the top face of the substantially flat package base 18 to form the interior chamber 22. Other types of lids may be used. For example, the lid 20 may be formed from metal, ceramic, or circuit board material. In addition or alternatively, the lid 20 may be flat and coupled to upwardly projecting walls extending from the base 18 (e.g., a cavity package).

Conventional techniques connect the lid 20 to the base 18. For example, after mounting the accelerometer chip 12B to the base 18, conventional fabrication processes can connect the lid 20 to the base 18 with an adhesive. As known by those skilled in the art, a difference in the potential between the lid 20 and base 18 undesirably can interfere with movement of the mass 28. Accordingly, conductive adhesive preferably is used to ensure that the lid 20 has the same potential as prescribed portions of the base 18. To that end, the base 18 may have a bond pad that directly contacts the lid 20 to provide such a same potential.

In some embodiments, the chamber 22 is hermetically sealed, thus preventing contaminants, air, or other environmental materials from contacting the microstructure. Moreover, the chamber 22 may also contain a relatively high viscosity buffering gas for further protecting the fragile microstructure. The hermetic seal thus is important for maintaining this gas within the device, thus extending the lifetime of the accelerometer chip 12B.

Figure 3A:
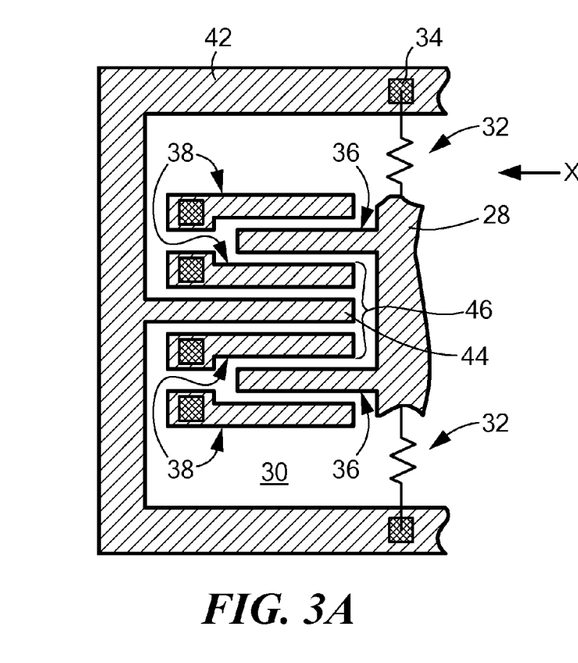
FIG. 3A schematically shows a perspective view of an accelerometer chip configured in accordance with illustrative embodiments of the invention.
Figure 3B:
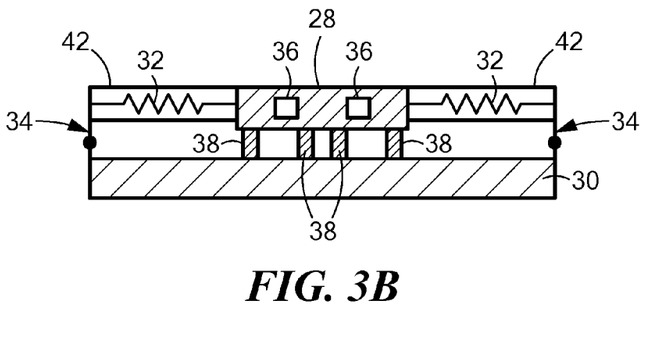
FIG. 3B schematically shows a cross-sectional view of the accelerometer chip of FIG. 3A.

FIG. 3A schematically shows a plan view of a portion of the accelerometer chip 12B, while FIG. 3B schematically shows a cross-sectional view of the accelerometer chip 12B in FIG. 3A when viewed from the direction of Arrow X in FIG. 3A. Specifically, as best shown in FIG. 3B, the accelerometer chip 12B of these figures includes a movable mass 28 suspended above a substrate 30 by a plurality of springs 32. Anchors 34 extending from the substrate 30 fixedly and rigidly connect the springs 32 to the substrate 30.

As best shown in FIG. 3A, the mass 28 has a plurality of movable fingers 36, integrally extending from its body. Each movable finger 36 is positioned between two stationary fingers 38 extending upwardly from the substrate 30. As an example, FIG. 3A shows two movable fingers 36 that each are positioned between two stationary fingers 38 extending upwardly from the substrate 30. Accordingly, this figure shows two variable capacitors for detecting acceleration. Of course, those skilled in the art understand that this could have a number of other variable capacitors in other directions. Accordingly, discussion of the specific variable capacitors of this figure is for exemplary purposes only.

In illustrative embodiments, this portion of the accelerometer chip 12B operates like many conventional accelerometers, such as those distributed by Analog Devices, Inc. of Norwood Mass. For example, where they have consistent parts, the accelerometer chip 12B may be structurally similar to that shown in U.S. Pat. No. 5,939,633, which is assigned to Analog Devices, Inc. As such, from the perspective of the drawing (FIG. 3A), the top plate of each capacitor may be considered to be the positive capacitive plate, while the bottom plate of each capacitor may be considered to be the negative capacitive plate. The output signals, which are delivered to an output node/port 40 (FIG. 3C, discussed below) on the accelerometer chip 12B, should be substantially zero (or some other predefined value) when the movable finger 36 is positioned precisely between the two plates.

During use, the output of the accelerometer chip 12B delivers a signal to its output port 40 that is known as an "offset signal." Ideally, this signal is known, stable, and low voltage and/or current signal. For example, to conserve power, the offset signal may be set to zero volts or zero amps. The signal produced by acceleration thus is calculated with the knowledge of this offset voltage. An unstable offset thus can adversely affect the accuracy of the accelerometer.

Undesirably, the movable fingers 36 of many prior art accelerometers are not positioned in this manner. Specifically, as noted above, linear stress, torsional stress, mechanical stress, and other stresses often significantly skew the output signal of an accelerometer. In the accelerometer chip 12B shown, for example, stress may cause the movable fingers 36 to maintain a normal rest position that is closer to the positive capacitive plate or the negative capacitive plate. As such, this creates a positive or negative signal (i.e., error) at the output port 40 of the accelerometer chip 12B, even when not subject to an acceleration. For example, if the offset voltage is set at zero volts, this error voltage may be 0.2 volts, 0.3 volts or some other amount. Accordingly, when subjected to an inertial signal, such as an acceleration event, this noise error signal corrupts the actual acceleration signal, producing accurate results.

During use, the inventor discovered that the anchors 34, which are rigidly secured to the substrate 30, generally move in a manner that corresponds to the amount of stress in the substrate 30. The inventor realized that, because the mass 28 is connected to the anchors 34, the movable finger 36 also moves in a corresponding manner, which causes the noise in the output signal of the accelerometer chip 12B. After testing, the inventor realized that if he could track anchor movement, he could dynamically track the results of stress. In other words, anchor movement provides objective data about the effect of stress on the mass 28. This ultimately led the inventor to integrate an additional structure directly into the accelerometer chip 12B to track anchor movement and dynamically compensate for the detected stress. Accordingly, this additional structure substantially mitigates the effect of stress on the accelerometer chip 12B before it reaches the output port 40 of the chip. Stated another way, the accelerometer chip 12B has integrated structure to self-correct many of the adverse effects of stress.

To that end, as shown in FIG. 3A, the accelerometer chip 12B has a movable frame 42 suspended from the substrate 30 by the anchors 34. FIG. 3B also shows a portion of the frame 42, although it is partly blocked by the mass 28. Accordingly, in this embodiment, the frame 42 preferably contacts nothing but the anchors 34. Of course, the frame 42 may contact other features in other embodiments. As such, movement of one or more anchors 34 causes a corresponding movement of the frame 42. In other words, when at least one anchor 34 moves in response to stress, the frame 42 moves in a corresponding manner.

To capture anchor/frame movement, the frame 42 has one or more frame fingers 44 that each forms a pair of variable capacitors (referred to as "noise correcting capacitors 48") with pairs of stationary fingers 38. FIG. 3A schematically shows one such capacitor 48, where the frame finger 44 forms a variable capacitor between a negative stationary finger 38 and a positive stationary finger 38. Accordingly, the noise correcting capacitor 48 shares one or more conductive plates (i.e., the stationary fingers 38) with the acceleration capacitor 46. In illustrative embodiments, the frame 42 has a plurality of frame fingers 44 that cooperate to mitigate noise in this manner. In other embodiments, the frame fingers 44 may form noise correcting capacitors 48 in other manners, such as with one stationary finger each.

Figure 3C:
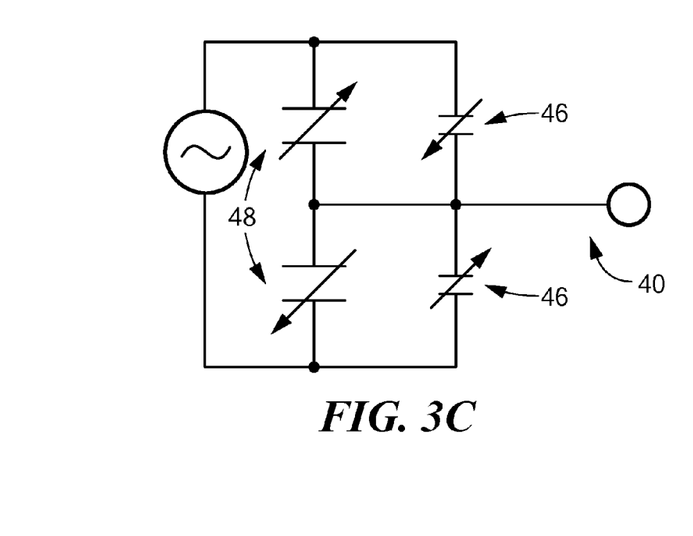
FIG. 3C shows a circuit that is substantially equivalent to the circuit provided by the accelerometer chip.

FIG. 3C shows a circuit schematic detailing the electrical relationship of the variable acceleration capacitors 46 (i.e., the variable capacitors formed by the movable fingers 36 in the stationary fingers 38), and the noise correcting capacitors 48 shown in FIGS. 3A and 3B. In illustrative embodiments, the frame 42 is much stiffer than the springs 32 that control movement of the mass 28. Accordingly, the frame 42 should be substantially unmovable or only move a negligible amount when subjected to anticipated accelerations. For example, when subjected to anticipated accelerations, the frame 42 may have less than about one percent of the sensitivity of the movable mass 28. In addition, it is anticipated that stress will move the frame 42 much less than the normal movement of the mass 28.

The circuit schematic of FIG. 3C merely is a simplified representation of the circuit produced by the accelerometer chip 12B. Specifically, all of the capacitors formed between the movable fingers 36 and the positively charged stationary fingers 38 are collectively represented by the variable capacitor in the top left of the circuit, while all the capacitors formed between the movable fingers 36 and the negatively charged stationary fingers 38 are collectively represented by the variable capacitor in the lower left of the circuit. The arrows show their polarity. The output port 40 connects between these two variable capacitors.

In a corresponding manner, the capacitors formed between the frame fingers 44 and the positively charged stationary fingers 38 are collectively represented by the variable capacitor in the bottom right of the circuit, while the capacitors formed between the movable fingers 36 and the negatively charged stationary fingers 38 are collectively represented by the variable capacitor in the upper right of the circuit.

As shown, the output port 40 connects between these two pairs of variable capacitors. Accordingly, all of these capacitors combine at the output port 40 in a manner that produces an offset signal or output signal with substantially reduced stress noise. As such, depending upon the polarity of the capacitors, the stress noise may be considered to be subtracted from, or added to, the output of the variable accelerometer capacitors to produce the desired offset or output signals. In other words, in this embodiment, the accelerometer is configured to subtract the stress noise from the accelerometer capacitor signal, thus producing a mitigated output signal or offset signal.

The accelerometer components may be formed from a wide variety of well-known surface micromachining techniques to form a microelectromechanical system (MEMS) accelerometer chip 12B. For example, conventional fabrication processes may use additive and subtractive processes that involve oxides, nitrides, single crystal silicon, and polysilicon, among other materials, to form the accelerometer chip 12B. For example, the frame 42 and mass 28 may be formed from polysilicon in the same processing step to form a unitary, integrated accelerometer chip 12B.

Figure 4:
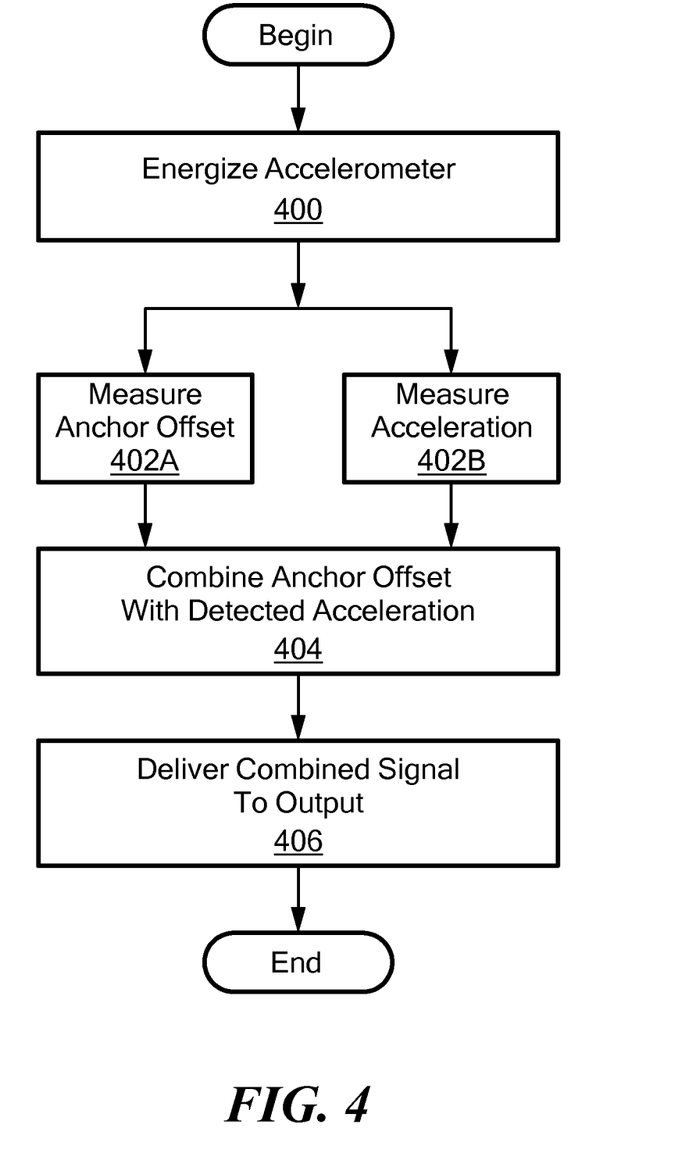
FIG. 4 shows a method of operating the accelerometer chip of FIG. 3A in accordance with illustrative embodiments of the invention.

FIG. 4 shows a method of operating the accelerometer chip 12B of FIGS. 3A-3C in accordance with illustrative embodiments of the invention. It should be noted that this process is a simplified version of an actual process that can have many more steps. In addition, some of the steps of the process can be performed in a different order than that disclosed, and some sequential steps can be performed at substantially the same time. Accordingly, this process is but one of many different illustrative processes that may implement various embodiments the invention.

The process begins at step 400, in which the accelerometer chip 12B is energized. For example, an external source may deliver an AC signal to the various nodes (e.g., the mass 28, stationary fingers 38, frame 42, etc.) of the accelerometer chip 12B. The internal circuitry or ASIC may control or modify this signal as appropriate.

The process then continues to steps 402A and 402B, which can occur substantially simultaneously. Specifically, in these steps, the process measures acceleration (i.e., using the acceleration capacitors 46) and anchor produced offset/noise (i.e., using the noise correcting capacitors 48). To those ends and as noted above, the process measures anchor produced offset by detecting the amount of movement of the frame fingers 44, while detecting acceleration by measuring movement of the movable mass 28 through its movable fingers 36. Next, the process combines these two detected signals (step 404), and delivers a combined signal to the output port 40 (step 406), thus completing the process.

Accordingly, illustrative embodiments provide a substantially noise mitigated output acceleration signal without requiring extra off-chip components or external signal processing. For example, such embodiments do not require signal conditioning chips that process noise out of the corrupted output signal of the accelerometer chip 12B. Instead, the accelerometer chip 12B simply produces an output offset or acceleration signal that has minimal noise from stress.

Although the above discussion discloses various exemplary embodiments of the invention, it should be apparent that those skilled in the art can make various modifications that will achieve some of the advantages of the invention without departing from the true scope of the invention.

What is claimed is:

1. An accelerometer comprising:
   an anchor secured to a substrate;
   a movable mass springedly coupled to the anchor by a spring which is directly connected to the anchor;
   a movable frame rigidly connected to the anchor;
   a stationary finger connected to the substrate;
   a movable finger connected to the movable mass, the movable finger forming an acceleration capacitor with the stationary finger; and
   a frame finger connected to the movable frame, the frame finger forming a noise correcting capacitor with the stationary finger.

2. The accelerometer as defined by claim 1, further comprising circuitry disposed in the substrate and coupled to a gaming system.

3. The accelerometer as defined by claim 1, further comprising a plurality of movable fingers comprising the movable finger and a plurality of stationary fingers comprising the stationary finger, the plurality of movable fingers being connected to the movable mass and forming a plurality of acceleration capacitors with the plurality of stationary fingers.

4. The accelerometer as defined by claim 1, wherein the movable frame is suspended above the substrate.

5. The accelerometer as defined by claim 1, further comprising a plurality of frame fingers comprising the frame finger and a plurality of stationary fingers comprising the stationary finger, the plurality of frame fingers being connected to the movable frame and forming a plurality of noise correcting capacitors with the plurality of stationary fingers.

6. The accelerometer as defined by claim 1, further comprising circuitry electrically connected with the acceleration capacitor and the noise correcting capacitor, the circuitry being configured to provide a compensated signal by combining an acceleration signal obtained from the acceleration capacitor with a noise signal obtained from the noise correcting capacitor.

7. The accelerometer as defined by claim 1, wherein the anchor is a first anchor and the spring is a first spring, the accelerometer further comprising a second anchor, wherein the movable mass is springedly coupled to the second anchor by a second spring which is directly connected to the second anchor.

8. The accelerometer as defined by claim 1, wherein the acceleration capacitor is configured to detect acceleration occurring in a plane parallel to the substrate.

9. An accelerometer comprising:
 a movable mass springedly coupled to an anchor by a spring directly connected to the anchor, the anchor being connected to a substrate;
 a movable frame rigidly connected to the anchor;
 an acceleration capacitor configured to detect acceleration of the movable mass relative to the substrate, the acceleration capacitor having a first stationary finger connected to the substrate and a movable finger connected to the movable mass; and
 a noise correcting capacitor configured to detect movement of the anchor relative to the movable mass, the noise correcting capacitor having a second stationary finger connected to the substrate and a frame finger connected to the movable frame.

10. The accelerometer as defined by claim 9, further comprising circuitry electrically connected with the acceleration capacitor and the noise correcting capacitor, the circuitry being configured to provide a compensated signal by combining an acceleration signal obtained from the acceleration capacitor with a noise signal obtained from the noise correcting capacitor.

11. The accelerometer as defined by claim 10, wherein the substrate is connected to the circuitry via one or more wire bonds.

12. The accelerometer as defined by claim 9, wherein the anchor is a first anchor and the spring is a first spring, the accelerometer further comprising a second anchor connected to the substrate, wherein the movable mass is springedly coupled to the second anchor by a second spring directly connected to the second anchor.

13. The accelerometer as defined by claim 12, wherein the movable frame is rigidly connected to the second anchor.

14. The accelerometer as defined by claim 9, further comprising a plurality of frame fingers that extend from the movable frame and form a plurality of noise correcting capacitors with a plurality of stationary fingers connected to the substrate.

15. The accelerometer as defined by claim 9, wherein the acceleration capacitor is configured to detect acceleration occurring in a plane parallel to the substrate.

16. A method comprising:
 sensing accelerations of a movable mass using an acceleration capacitor, the acceleration capacitor comprising a stationary finger connected to a substrate and a movable finger connected to the movable mass, wherein the movable mass is springedly coupled to an anchor through a spring directly connected to the anchor, the anchor being connected to the substrate; and
 detecting displacement of the anchor using a noise correcting capacitor, the noise correcting capacitor comprising the stationary finger and a frame finger connected to a movable frame, the movable frame being rigidly connected to the anchor.

17. The method as defined by claim 16, wherein sensing the accelerations of the movable mass comprises sensing the accelerations in a plane that is parallel to the substrate.

18. The method as defined by claim 16, further comprising compensating a sense signal representing a variation in capacitance of the acceleration capacitor for displacement of the anchor by combining the sense signal with a compensation signal obtained from the noise correcting capacitor.

19. The method as defined by claim 18, wherein compensating the sense signal is performed using sense circuitry coupled to the substrate.

20. The method as defined by claim 18, wherein compensating the sense signal comprises subtracting the compensation signal from the sense signal.

* * * * *